United States Patent [19]

Moore et al.

[11] Patent Number: 4,843,512
[45] Date of Patent: Jun. 27, 1989

[54] RECORDING DISK CENTERING HUB

[75] Inventors: Larry D. Moore, Weatherford, Okla.; Vurnen J. Leonard, Minneapolis; David M. Perry, Moundsview, both of Minn.

[73] Assignee: Minnesota Mining and Manufacturing Company, St. Paul, Minn.

[21] Appl. No.: 90,547

[22] Filed: Aug. 28, 1987

[51] Int. Cl.⁴ ............................................. G11B 23/03
[52] U.S. Cl. .................................................. 360/133
[58] Field of Search ................... 360/133, 135, 97–99

[56] References Cited

U.S. PATENT DOCUMENTS

| | | | |
|---|---|---|---|
| 4,166,622 | 9/1979 | Rager | 274/1 R |
| 4,445,157 | 4/1984 | Takahashi | 360/133 |
| 4,459,628 | 7/1984 | Barton | 360/133 |
| 4,503,474 | 3/1985 | Nigam | 360/133 |
| 4,520,470 | 5/1985 | d'Alayer de Costemore d'Arc | 360/133 |
| 4,571,718 | 2/1986 | Cahill et al. | 360/133 |
| 4,590,532 | 5/1986 | Saito | 360/133 |
| 4,600,955 | 7/1986 | Kegrult | 360/99 |
| 4,623,570 | 11/1986 | Alexander et al. | 428/65 |
| 4,631,609 | 12/1986 | Erickson et al. | 360/135 |
| 4,717,981 | 1/1988 | Nigam et al. | 360/133 |

FOREIGN PATENT DOCUMENTS

| | | |
|---|---|---|
| 893409 | 6/1982 | Belgium . |
| 111217 | 6/1984 | European Pat. Off. . |
| 226378 | 6/1987 | European Pat. Off. ............ 360/133 |
| 57-130237 | 8/1982 | Japan ................................. 360/133 |

OTHER PUBLICATIONS

Alexander, J. L., "Dimensional Track Stability Measurement Using a Standard Head", *Computer Technology Review*, Summer, 1984.

*Primary Examiner*—John H. Wolff
*Assistant Examiner*—Matthew J. Bussan
*Attorney, Agent, or Firm*—Donald M. Sell; Walter N. Kirn; Douglas B. Little

[57] ABSTRACT

Recording medium disk-hub combination wherein the hub has a central hole whose periphery is bounded at least partly by three flexure members which circumscribe a cylinder corresponding to a disk drive spindle. The three flexure members are arranged in a triangular configuration, and the parts of such flexure members that circumscribe the cylinder are coplanar, forming a flexure member plane of contact. The axial center line of the recording medium disk is spaced from the flexure member plane of contact by no more than three times the thickness of the disk itself. The combination is preferably designed with the ratio of the coefficient of thermal expansion of the hub to that of the recording medium disk being between 0.7 and 1.4. Hub is made magnetic, e.g., by attaching a magnetizable disk. The combination is especially useful for removable recording disks intended to cooperate with disk drives having circular motor spindles and magnetic hold down. The combination yields improvements in off track or centering accuracy.

24 Claims, 3 Drawing Sheets

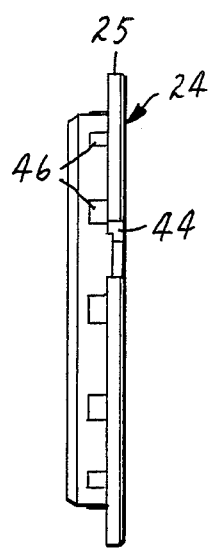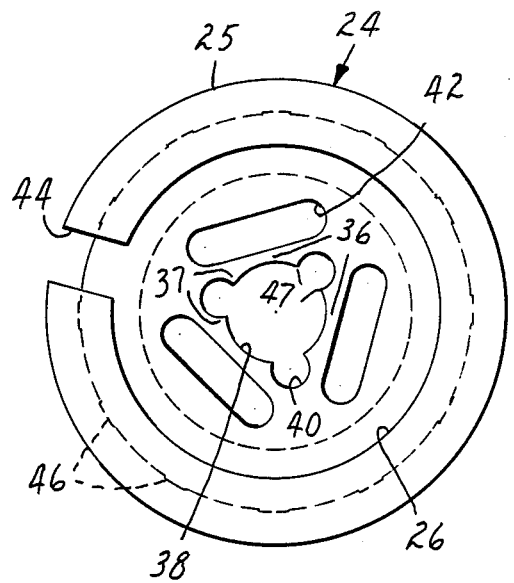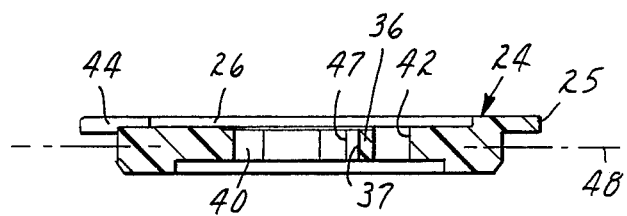

RECORDING DISK CENTERING HUB

TECHNICAL FIELD

This invention relates to recording disks which may be flexible, rigid, or stretched surface recording disks, which may be applied in magnetic, magneto-optic, or optical recording. More particularly, it relates to an improved centering hub for such recording disks.

BACKGROUND

Recording disks such as magnetic recording disks or optical recording disks usually cooperate with a spindle or chucking mechanism in a disk drive, which rotates the recording disk in close proximity to a transducer or head. The head may read and/or write data onto the recording disk. The data is usually arranged in concentric or spiral data tracks on the recording disk. In the case of magnetic recording, a magnetic read head is positioned over the desired data track to read specific data.

It is important be able to locate data tracks accurately, so that the maximum signal strength reaches the read head. There are several factors which influence the ability to position the head over a given data track. Factors related to the recording medium are:

Track Density—there is a tendency toward making recording media of smaller diameters and increasing the number of tracks per inch of recording medium diameter in order to increase recording density.

Removability—it is also desirable to make recording media disks which are removable. That is they are contained in envelopes (like floppy disks) or cartridges (like 3.5 inch microfloppy disks and certain removable Winchester type disks) which can be inserted in a disk drive and later removed and transported. Each time a recording disk is removed from and later reinserted into a disk drive, there is a chance that the position of the circular data tracks may be slightly changed (i.e. made off-center).

Centering Hub—the type of hub at the center of a recording disk which mates with the disk drive spindle also has an influence over the track location. The centering hub could be simple as a circular hole slightly larger in diameter than the disk drive motor spindle. U.S. Pat. No. 4,600,955, FIG. 3, shows a recording disk having a centering hub known as the "V" block hub. In a V block, the hub has a triangular shaped hole which engages the circular disk drive spindle. Two sides of the triangle are rigid, and the third side is a resilient member which holds the spindle against the two rigid sides. Both the circular hole and the V block are subject to changing positions as the sides of the hole wear. Also, if the recording medium with a V block hub is changed from one disk drive to another with a slightly different spindle size, the resilient member may shift the data tracks to be slightly off center in the second disk drive.

U.S. Pat. No. 4,459,628 teaches a hub design for a rigid disk which features symmetrically spaced resilient flexure elements around a central opening in the hub for frictionally gripping and centering a drive spindle. The centering hub depicted in FIG. 8 of that patent has an equilateral triangle shape with slots disposed parallel to the sides of the triangle, the triangle and slots defining three resilient flexure elements, which are shown to engage the drive spindle at 3 points (1 at the middle of each side of the triangle).

Another type of hub which has been tried utilizes a collet with a number of spring fingers (e.g., five) around its inside diameter and loaded toward the center of the collet.

If one has recorded a number of concentric data tracks on a recording medium, removes it from the disk drive in which is resides, and then inserts it onto a disk drive spindle, the ability of the recording disk to center itself on the spindle so that the spindle corresponds exactly to the center of the data tracks may be called centering repeatability. The actual inaccuracy or maximum distance between a data track which is somewhat off center and the head which is reading the track is called off track, and may be expressed in micro inches or micro meters.

The centering hub can amplify spindle tilt or TIR (total indicated run out). One object of this invention is to minimize this amplification effect which can dominate measured off track in removable disk recording media.

One type of recording medium with which this invention is particularly concerned is stretched surface recording disks (SSR) which generally comprise a rigid annular support and a thin polymeric film (recording medium film) having a recording layer, suitably attached to the periphery of the support. Preferably, the recording medium film is annular in shape. The rigid annular support preferably has raised annular ridges at or near its inside and outside diameters and a base portion between the raised annular ridges. Usually, there are recording medium films on both sides of the rigid annular support. The recording medium film is stretched taut, out of contact with the base portion of the support and is attached to the support member at or near the inner and outer annular ridges. One patent describing SSR is U.S. Pat. No. 4,623,570.

In that patent it is explained that the recording medium film of an SSR is held in uniform tension. This type of stress is produced by stretching film over a circular ring or hoop.

SSR are superior to floppy disks in that a pressure pad is not required, and the recording surface has substantially the same overall stability as the relatively more massive support to which it is attached. In addition, the SSR provides a flat recording surface which may be deformed slightly to conform to a transducer head. However, in order to take full advantage of the characteristics of SSR, it is desirable to include a hub which tends to minimize off track in removable SSR.

DISCLOSURE OF INVENTION

An improved recording medium disk has been invented which comprises:

A. an annular recording medium disk having a thickness t; and

B. a hub having a central hole the sides of which are bounded at least in part by three flexure members in a triangular configuration, and the center of which corresponds to the center of the circle or cylinder circumscribed by the flexure members, wherein the flexure member plane of contact is spaced from the cross section center line of the recording medium disk no more than a distance of three times t ($3 \times t$).

The term triangular configuration, for purposes of this description, means in approximately a triangular shape but not necessarily an exact triangle.

The cross section center line of the recording medium disk is defined as the line perpendicular to the recording medium disk axis which bisects its cross section into two equal halves (i.e. halves of equal cross sectional area). The cross section is taken on a plane normal to the recording medium disk and through its center.

The flexure member plane of contact is the plane defined by the three flexure members at the portion of each which is intended to contact the drive spindle (i.e. the portion touching the smallest circle circumscribed by the three flexure members). If such portions of the flexure members are intended to touch the drive spindle at more than a point of contact (i.e. a line or area of contact) then the flexure member plane is defined by the center points of such line or areas.

Preferably, the cross section center line of the recording medium disk is no more than a distance of $1.5 \times t$ from the flexure member plane of contact, and more preferably it lies in the flexure member plane of the contact. In the case of SSR, one may speak of the distance between the cross section center line of the SSR support and the flexure member plane of contact, since the support and hub may be bonded together before the recording medium film is attached to the support under radial tension to make the complete recording disk. Thus, in the case of SSR the same relationship as above applies wherein t is understood to be the greatest thickness of the support.

For economy, the whole hub should be fabricated as a single part, e.g., molded plastic. It is also preferably to match the coefficient of thermal expansion of the hub material with the material of construction of the recording disk as closely as possible. Preferably the ratio of the coefficient of thermal expansion of the hub material to that of the recording medium disk material is between 0.7 and 1.4.

It is preferred that the flexure elements are arranged in an equilateral triangle pattern and that each flexure element has two protrusions which contact the cylindrical disk drive spindle, giving six points of contact between the spindle and the hub.

BRIEF DESCRIPTION OF THE DRAWINGS

FIG. 5 is a bottom plan view of the hub.

FIG. 6 is a side view of the hub of FIG. 5.

FIG. 7 is a cross sectional view of the hub of FIG. 5

DETAILED DESCRIPTION

Although the following description of the invention will make reference principally to SSR utilizing the inventive hub, it should be understood that the same principles explained below will apply to other types of recording media (e.g., rigid Winchester type and flexible diskette-type media).

Figure 1:
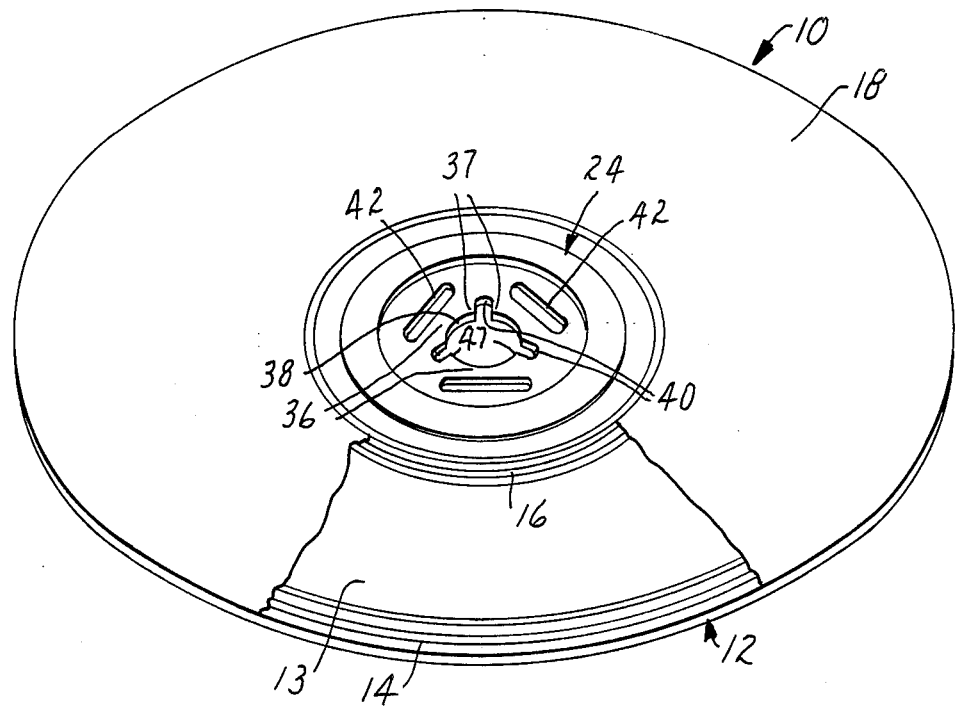
FIG. 1 is a pictorial view of an SSR with the inventive hub.
Figure 2:
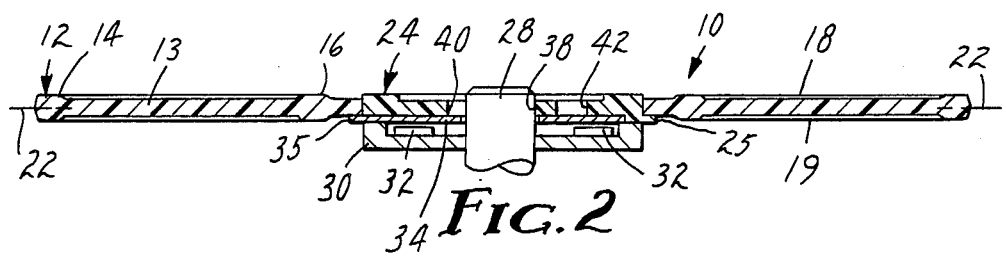
FIG. 2 is a cross section view of the SSR in FIG. 1 showing a few motor parts.

Referring to FIG. 1, the parts of the SSR 10 are: annular support 12 having base portion 13, outer raised annular ridge 14, and inner raised ridge 16; and, upper recording medium film 18. The lower recording medium film 19 is shown in FIG. 2.

The details and manufacture of SSR is explained in general in the patent art, see for example, U.S. Pat. No. 4,623,570. The annular support is made of a preferably non-magnetic material, for example, aluminum or a thermosetting or thermoplastic resin. The following polymeric resins may be used: polysulfone, polyphenylene sulfide, polyester, polyetherimide, acrylonitrile-butadiene-styrene, polystyrene, polyamide (nylon), or polycarbonate resins which may be filled with materials such as glass beads, glass fibers, and mica. The base portion of the support may be a flat area between the inner and outer annular ridges or it may be spokes which join these ridges.

The recording media films 18 and 19 can be webs of any material which is useful for recording media and which can be held in uniform tension. Typically, such recording media film would comprise a substrate on which is coated a pigment-binder recording medium or other type of recording medium magnetizable layer such as a thin metal film. The substrate of the recording medium film may be a polymeric material such as polyester, or polyimide.

The recording media films 18 and 19 can be attached to support 12 by adhesives, preferably acrylate or methacrylate functional adhesives curable by radiation (e.g., hydantion hexacrylate). In order to improve adhesion of polyethylene terephthalate (a typical recording medium substrate), the surface to be adhered to the support may be primed with a priming solution such as 5 to 20% hydantion hexacrylate, plus 0.1 to 0.4% photoinitiator (e.g., Irgacure 651 made by Ciba-Geigy Company) in methylethyl ketone solvent. Such a primer could be coated or sprayed onto the polyethylene terephthalate film at about 0.1 to 0.2 mm thickness and cured or partially cured by ultraviolet light.

The inner and outer raised annular ridges 16 and 14 may have various cross sectional shapes such as triangular, semicircular, or the shape as shown in U.S. Pat. No. 4,631,609 which is particularly advantageous.

The design for the ridges shown in that patent features an outer attachment surface on the outer raised annular ridge which is radially outward from the very top or apex of the ridge and is arranged to keep the adhesive bonding the recording medium to the support away from the data band area of the recording medium (which is over the base portion of the support). There is also an annular inner film attachment surface on the inner raised annular ridge located radially inward of the apex of the inner raised ridge and having the same function.

The upper and lower recording media films are fixed in uniform tension (by means explained in U.S. Pat. No. 4,623,570) and bonded to support 12. Preferably, the uniform tension or stretching of the two recording medium films is the same so that there is no deformation of the SSR caused by an imbalance of such stress from the top to the bottom. Adhesive is applied to the bonding area of the raised inner and outer annular ridges 16 and 14, and then the upper and lower recording media films 18 and 19 are placed into contact with the bonding area on the support, after which the adhesive is cured (e.g., by radiation). Preferably, before adhesive is applied to support 12, hub 24 is inserted into and attached to the support.

Referring now to FIGS. 1, 2 and 4–7, throughout the discussion and figures, the side having recording medium film 18 will be considered the top side of the SSR and hub, and the side having film 19 will be considered the bottom. The hub 24 has center hole 38 having lobes 40. The hub also has three slots 42 and the slots together with the center hole define three flexure members 36. The hub also has flange 25 for locating it axially with respect to the support 12.

Located around the hub at the base of the flange portion are energy directors 46. These energy directors would be present for the purpose of ultrasonically bonding the hub to the support in the case where both were made of materials which could be so bonded. For example, if both the support 12 and hub 24 were made of polyphelylene sulfide polymer, they could be ultrasonically bonded without the use of an adhesive.

The center hole 38, by means of its special shape formed by the lobes 40, forms protrusions 37, two on each flexure member 36.

There is an interference fit between the flexure members 36 and the motor spindle 28. Protrusions 37 contact the cylindrical spindle 28, thus giving 6 points of contact in all between the hub and spindle. The width of slots 42 can serve to limit the deflection of flexure members 36 when the recording medium 10 is placed on the spindle 28, thus limiting the stress which each flexure member can experience. In the figures, the portion of center hole 38 between each lobe is curved to approximately match the periphery of the spindle 28.

FIG. 2 shows the disk drive spindle motor platform 30 having attached thereto drive magnet 32. The drive magnet causes the recording medium disk 10 to rotate with the spindle motor by means of magnetic force. The drive spindle motor may engage the hub by other means. For example, magnetic force may be used to hold the recording medium disk down while a mechanical means (e.g., a drive pin in a hole in the hub offset from the center) may be used to rotate the disk.

Figure 3:
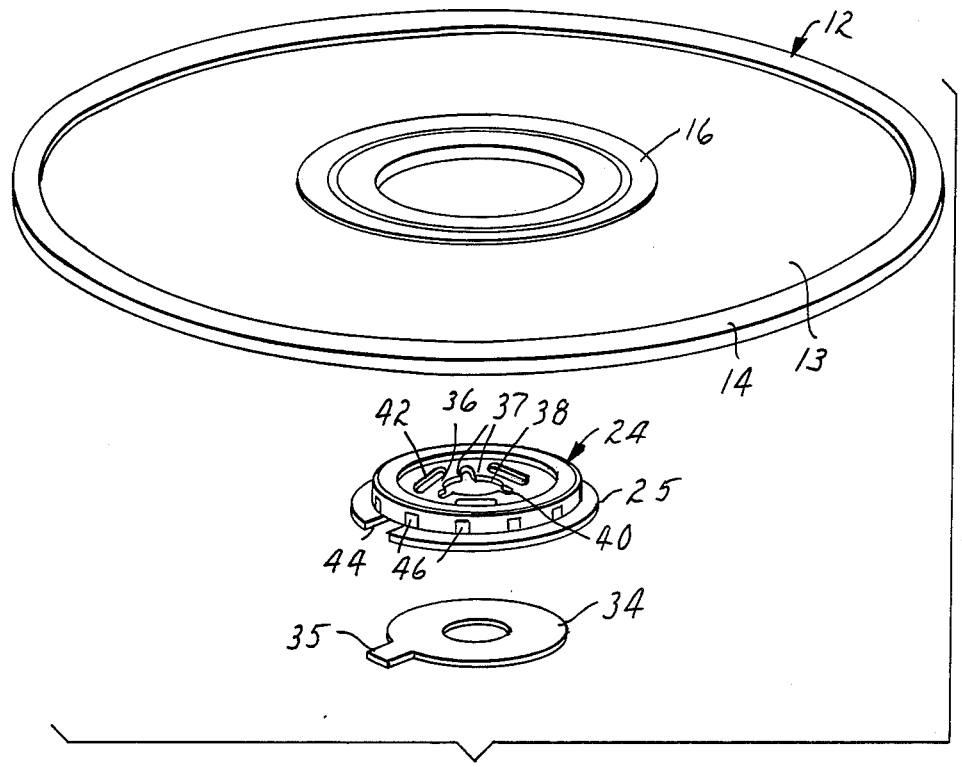
FIG. 3 is an exploded view of an SSR support with the inventive hub.
Figure 4:
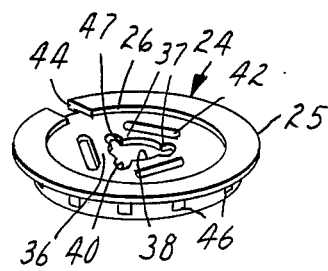
FIG. 4 is a pictorial view of the bottom of the hub, the top having been shown in FIG. 3.

At least part of the hub may be magnetizable. In the exploded view of FIG. 3, disk-shaped yoke 34 is made of a magnetizable metal (e.g., 410 stainless steel) and is attached (e.g., by isocyanate adhesive) to the hub within bottom recess 26. Key 35 on the yoke 34 fits within keyway 44 in the hub 24.

An alternative way to make the hub magnetizable is to manufacture the part which would face drive magnet 32 out of a plastic material which itself is attracted to a magnet, such as carbonyl iron. One means for accomplishing this is to mold the hub in two separate pieces: a first piece comprising a plastic triangle with the center hole (the outside edges of the triangle to form the inside edges of slots 42); and, the second piece comprising the remainder of the hub and molded out of a plastic resin filled with iron particles in a shape which mates with the first piece so as to form slots 42 and the other features of the hub as shown.

Figure 8:
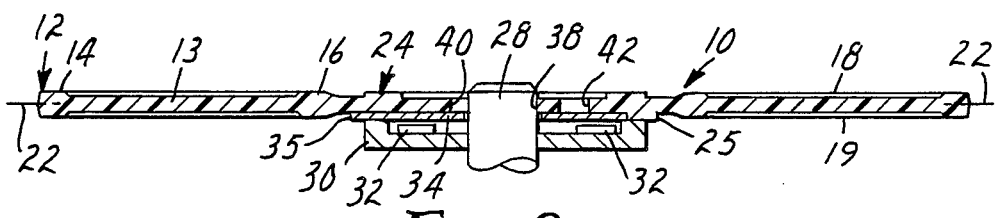
"FIG. 8 is a cross-section view of an SSR similar to FIG. 2, but with hub 24 and support 12 being molded together as a single unit."

As previously stated, it is preferred to match as closely as possible the coefficient of thermal expansion of the hub and the recording medium disk (or support 12 in the case of SSR). Thus, if the support is made of a glass filled resin, the hub should also be made of such material if possible. However, due to the intricacies of the hub shape, it may be difficult to form such hub of such filled resin by injection molding techniques. As an alternative, it may be more feasible to mold the hub and support as one integral piece (see FIG. 8), possible made of resin with a relatively low filler concentration.

In FIG. 2, the cross section center line of the recording medium disk (cross section center line of support for SSR) is shown as line 22. The flexure member plane of contact is shown as line 48 in FIG. 7. The portion of each flexure member 36 intended to contact the drive spindle comprises the two protrusions 37 on each of the three flexure members. Each protrusion would form a short line of contact 47 with the spindle and the flexure member plane of contact bisects all such lines. Line 48 also happens to be (by coincidence) the approximate cross section center line of the hub 24 itself; however, that is not necessarily always the case. The flexure members could be designed so that their portions intended to contact the drive spindle are not axially centered in the hub but, for example, aligned with the top or bottom of the hub. One preferred mode of the recording medium has the flexure member plane of contact below the cross section center lines of both the hub and recording medium disk, but still well within $3 \times t$ of the disk cross section center line.

The recording medium disk may have a surface effective for recording or reading (e.g. a magnetizable or optically readable surface) on just one of its two sides. This will be referred to as the recording surface whether it is used for recording, reading or both. It is preferred to have the flexure member plane of contact as close to the plane of the recording surface as possible, no more than $3 \times t$ from it, preferably coincident with it. Having the flexure member plane of contact in alignment with the recording medium surface would help minimize amplification of spindle tilt by the centering hub.

A procedure has been developed for measuring off-track or centering repeatability, see in general, Alexander, J. L., "Dimensional Track Stability Measurement Using a Standard Head", *Computer Technology Review*, Summer, 1984, pp. 102–103. With a magnetic recording medium disk loaded on a disk drive motor spindle, a pair of tracks at 600 kHz and 900 kHz are written a short distance (e.g., $1.5 \times$ track width or 60 micrometers) apart. The head is moved across this set of tracks in small, precise steps (e.g., of one micrometer) as the recording disk is rotated, and the signal amplitude is measured at each position. The location where the signal amplitude from both frequencies is the same is defined as the test track, and the read head is located at that track (i.e., the crossing point of the two signal amplitudes) for the purpose of testing off-track. Since the crossing point is rarely located exactly, it is found by linear interpolation, taking data points of each side of the crossing point and assuming frequency profiles of the 600 kHz and 900 kHz tracks are linear near the crossing point. Preferably, the crossing point signal is at least 20 dB (decibels) above the noise level. When conditions are changed from the original test track measurement, changes can be detected in the relative strengths of the two read signals. Off-track is reported as microinches of deviation of the test track from its original circular path. Thus, the term off-track literally means the distance from the center of the test track to the center of the read head when the read head is repositioned to the expected track location.

As explained previously, off-track can be due to several factors, only some of which are related to the hub. Before the off-track test begins, the total indicated runout (TIR) of the disk drive spindle itself should be measured so that the contribution of off-track from the spindle can be known and taken into account. If one considers the radius of the original test track to be r then off-track can be considered to be change in r ($\Delta r$).

The disk drive used for measuring off track is placed in an environmentally controlled chamber (i.e., temperature and humidity controlled), and a stepper motor is used to move the read head. A mark is placed on the motor spindle to indicate arbitrary 0°, and four marks are placed on the recording medium hub to indicate 0°, 90°, 180° and 270° around the hub. After the test track has been recorded and measured, the recording disk is removed and then reinserted with the marks lined up at 0° position. Then, the off track is measured.

Off track related to the hub is measured at 1f, i.e., one cycle per disk rotation, since an off-center track will result in track distortion with a period equal to the time of one revolution around the disk. Higher frequency track distortions (2f, 4f, etc.) may be caused by other distortions of the disk. Actually, several test tracks are written in the data band of the disk to substantiate the measurements. In addition, two track distortion measurements are preferably made before repositioning the disk to give an indication of test system accuracy. The distance between any two adjacent 600 kHz or 900 kHz tracks can be set at 2.5 mm.

After the first test, the recording medium disk is removed and then reinserted with the marks lined up at 90° and the off track is again measured. These steps are repeated at 180° and 270° with at least four measurements taken at each position.

The resulting 16 measurements can then be plotted in polar coordinates to obtain a pictorial representation of centering repeatability. The diameter of the smallest circle which can be used to contain all sixteen points represents overall centering accuracy of the centering hub plus drive motor ($\Delta r$). Looking at each cluster of four data points for each disk-spindle orientation (i.e., 0°, 90°, 180°, 270°) the proximity of the four data points to each other gives an indication of the hub centering precision or track repeatability. That is, even given that the track will be off center, it may be easier for a head servo mechanism to locate the off center track if it is off center in a consistent manner (i.e., the points are nearly coincident). Thus, the closer the points in each cluster are to each other, the better track repeatability is.

The inventive hub disk combination yields a recording medium which:

is capable of maintaining centering error between 10 and 100 microinches, depending on the magnetic force used to hold the disk down, and for a given spindle run out, minimizes $\Delta r$ due to that run out.

Spindle run out can be due to several factors, such as: the spindle being out of round, motor bearing run out, and spindle tilt (i.e., variance of the angle between the spindle and motor platform from 90°). Spindle tilt can greatly affect off track. In fact, it can be a much larger contributor to off track than the precision with which the hub centers the disk.

Measurements have been taken with SSR using the inventive hub, and the data have indicated $\Delta r$ as low as 12-21 microinches.

The hub disk combination of this invention is advantageous for removable recording media, e.g., SSR contained within a cartridge and intended to be temporarily inserted into a disk drive and later removed.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. The combination of a recording medium disk and a hub having a center hole, the sides of which circumscribe a cylinder, and which is, at least in part, bounded by three flexure members arranged in a triangular configuration, wherein:
   (a) a portion of each flexure member contacts said circumscribed cylinder; said portions being substantially coplanar;
   (b) the flexure member plane of contact is the plane defined by said portions of the three flexure members if they are points or by the center points of said portions if they are lines or areas of contact;
   (c) said flexure member plane of contact and the cross section center line of the recording medium disk are substantially in alignment; and
   (d) said cross section center line is defined as the line perpendicular to the recording medium disk axis which bisects the cross section of the recording medium disk, excluding the hub, into two equal halves.

2. The recording medium disk-hub combination of claim 1 wherein a ratio of the coefficient of thermal expansion of the hub to the coefficient of thermal expansion of the recording medium disk itself is between 0.7 and 1.4.

3. The recording medium disk-hub combination of claim 1 wherein the flexure members are in an equilateral triangle configuration.

4. The recording medium disk-hub combination of claim 3 wherein each flexure member approximates one side of a triangle and has two protrusions on the side facing the center hole.

5. The recording medium disk-hub combination of claim 1 wherein the hub and recording medium disk are molded together as a single unit.

6. The recording medium disk-hub combination of claim 1 wherein the hub is made, at least in part, of a magnetizable material.

7. The recording medium disk-hub combination of claim 6 which further comprises a magnetizable metal yoke attached to the hub.

8. The combination of claim 6 wherein the hub has been manufactured from 2 pieces, a first piece having a triangular-shaped portion defining the center hole, and a second piece, made of a magnetic material and having a shape which mates with the first piece.

9. The combination recited in claim 1 wherein the recording medium disk is a stretched surface recording medium disk comprising an annular, disk-shaped support member having raised annular ridges at or near its inside and outside diameters and a base portion between the raised ridges; and a recording medium film stretched taut and out of contact with the support member base portion and attached to the support member at the inner and outer raised annular ridges.

10. The combination recited in claim 9 wherein the hub and support member have been molded together as a single piece.

11. The combination recited in claim 9 wherein each flexure member approximates one side of a triangle and has two protrusions on the side facing the center hole.

12. The combination recited in claim 11 wherein on each flexure member, the portion of the side facing the center hole and located between the pair of protrusions is curved outwardly toward the outside diameter of the hub.

13. The combination of a recording medium disk having a recording surface on one side of the disk and a hub having a center hole, the sides of which circumscribe a cylinder, and which is, at least in part, bounded by three flexure members arranged in a triangular configuration, wherein:
   (a) a portion of each flexure member contacts said circumscribed cylinder, said portions being substantially coplanar;
   (b) the flexure member plane of contact is the plane defined by said portions of the three flexure members if they are points or by the center points of said portions if they are lines or areas of contact; and
   (c) said flexure member plane of contact is substantially in alignment with the plane of the recording surface.

14. The recording medium disk-hub combination of claim 13 wherein a ratio of the coefficient of thermal expansion of the hub to the coefficient of thermal expansion of the recording medium disk itself is between 0.7 and 1.4.

15. The recording medium disk-hub combination of claim 13 wherein the flexure members are in an equilateral triangle configuration.

16. The recording medium disk-hub combination of claim 15 wherein each flexure member approximates one side of the triangle and has two protrusions on the side facing the center hole.

17. The recording medium disk-hub combination of claim 13 wherein the hub and recording medium disk are molded together as a single unit.

18. The recording medium disk-hub combination of claim 13 wherein the hub is made, at least in part, of a magnetizable material.

19. The recording medium disk-hub combination of claim 18 which further comprises a magnetizable metal yoke attached to the hub.

20. The combination recited in claim 13 wherein the recording medium disk is a stretched surface recording medium disk comprising an annular, disk-shaped support member having raised annular ridges at or near its inside and outside diameters and a base portion between the raised ridges; and a recording medium film stretched taut and out of contact with the support member base portion and attached to the support member at the inner and outer raised annular ridges.

21. The combination recited in claim 20 wherein the hub support member have been molded together as a single piece.

22. The combination recited in claim 20 wherein each flexure member approximates one side of a triangle and has two protrusions on the side facing the center hole.

23. The combination recited in claim 22 wherein on each flexure member, the portion of the side facing the center hole and located between the pair of protrusions is curved outwardly toward the outside diameter of the hub.

24. The combination of an annular, disk-shaped support member, for a stretched surface recording medium, having raised annular ridges at or near its inside and outside diameters and a base portion between the raised annular ridges and a hub having a center hole, the sides of which circumscribe a cylinder, and which hole is, at least in part, bounded by three flexure members arranged in a triangular configuration, wherein:
   (a) a portion of each flexure member contacts said circumscribed cylinder; said portions being substantially coplanar;
   (b) the flexure member plane of contact is the plane defined by said portions of the three flexure members if they are points or by the center points of said portions if they are lines or areas of contact;
   (c) said flexure member plane of contact and the cross section center line of the support member are substantially in alignment; and
   (d) said cross section center line is defined as the line perpendicular to the support member axis which bisects the cross section of the support member, excluding the hub, into two equal halves.

* * * * *